United States Patent
Jung

[11] Patent Number: 6,158,202
[45] Date of Patent: Dec. 12, 2000

[54] DETHATCHING DEVICE

[76] Inventor: Koock Elan Jung, 564 Lockart Mt. Rd., Lake George, N.Y. 12845

[21] Appl. No.: 09/405,858

[22] Filed: Sep. 24, 1999

[51] Int. Cl.[7] ............................ A01D 57/12; A01B 33/14
[52] U.S. Cl. ................................ 56/12.7; 30/276; 172/42
[58] Field of Search ..................... 56/127, 13.2, 14.4, 56/17.2, 16.1, 364; 30/276; 172/13–17, 42

[56] References Cited

U.S. PATENT DOCUMENTS

| | | |
|---|---|---|
| Re. 32,551 | 12/1987 | Doering . |
| 4,151,646 | 5/1979 | Lane . |
| 4,250,623 | 2/1981 | Pittinger et al. ........................ 30/347 |
| 4,250,695 | 2/1981 | Comer et al. .......................... 56/12.7 |
| 4,689,941 | 9/1987 | Doering . |
| 4,802,536 | 2/1989 | O'Neal . |
| 4,936,886 | 6/1990 | Quillen ................................... 56/16.7 |
| 5,142,852 | 9/1992 | Nelson . |
| 5,313,770 | 5/1994 | Smothers ............................... 56/12.7 |
| 5,351,762 | 10/1994 | Bean ....................................... 172/17 |
| 5,408,813 | 4/1995 | Haban . |
| 5,524,425 | 6/1996 | Gallazzini . |
| 5,577,374 | 11/1996 | Huston ............................... 56/12.7 X |

*Primary Examiner*—Robert E. Pezzuto

[57] ABSTRACT

A dethatching device comprising a dethatching shaft assembly. The dethatching shaft assembly comprises at least one shaft and a plurality of flexible, non-metallic dethatching lines. Each of the plurality of flexible, non-metallic dethatching lines extend from the shaft and rotate with the shaft to engage the ground and loosen and remove any thatch on the ground and in the lawn.

15 Claims, 6 Drawing Sheets

DETHATCHING DEVICE

BACKGROUND OF THE INVENTION

The invention relates to a dethatching device. In articular, the invention relates to a dethatching device for lawn care purposes.

Rotary lawn sweepers and lawn rakes are well known in the prior art. These sweepers and rakes typically remove undesirable elements from the lawn by having protruding members engage the lawn at some level above the ground or dirt which supports the grass.

These sweepers and rakes are typically inexpensive to manufacture, and are relatively simple to use by the amateur gardener. While such sweepers and rakes are suitable for keeping the lawn free of loose debris, the protruding members typically do not extend far enough into the lawn to remove the coarse undergrowth known as thatch, which inhibits the growth of desirable grass.

Although thatch removers have also been previously known that operate to remove undesirable thatch and thereby promote growth of desirable grass, such thatch removal devices typically employ the use of rigid metal tines or blades that rotate with a drive assembly in an attempt to dethatch the lawn. These rigid metal tines or blades may remove thatch, however they also may adversely harm roots, stalks, and other parts of the grass due to their inability to readily conform to the contour of the lawn. In other words, these rigid metal tines or blades strike the ground without regard to the roots, stalks, and other parts of the grass, and will often dig up the roots of the grass. Further, these rigid metal tines and blades may also cause associated problems with insects, fungus, disease and other lawn-related problems. Also, these prior dethatching methods are often incomplete requiring additional work. Another drawback is that the rigid metal tines or blades may readily break and replacement thereof is difficult and time consuming. Additionally, the rigid metal tines and blades are perpendicular to the ground rather than swept back at an angle and, therefore, tend to break and dig into the ground causing damage to the ground surface.

Thus, a need exists for providing a dethatching device that does not dig-up or otherwise harm the lawn that is being dethatched. Further, a need exists for a dethatching device that does not require replacement of rigid metal tines or blades.

SUMMARY OF THE INVENTION

A dethatching device comprising a dethatching shaft assembly. The dethatching shaft assembly comprises at least one shaft and a plurality of flexible, non-metallic dethatching lines. Each of the plurality of flexible, non-metallic dethatching lines extend from the shaft and rotate with the shaft to engage the ground and loosen and remove any thatch on the ground and in the lawn.

Further, the dethatching device further comprises a motive device, rear wheel assembly, and handle assembly, and the dethatching shaft assembly further comprises at least one wheel. The dethatching shaft assembly is connected to the motive device by a drive connection.

Also, the flexible, non-metallic dethatching lines are connected to the shaft of the dethatching shaft assembly by a connection. The shaft of the dethatching shaft assembly can further comprise a plurality of fixment rings, and the flexible, non-metallic dethatching lines are connected to the fixment rings.

An additional aspect of the dethatching device comprises one of the flexible, non-metallic dethatching lines being attached to one of the plurality of fixment rings. The flexible, non-metallic dethatching lines are connected to the shaft of the dethatching shaft assembly is selected from tied connections, bound connections, fixed connections, fastened connections, anchored connections, moored connections, lashed connections, and combinations thereof.

A further aspect of the invention provides the dethatching shaft assembly including at least one flexible line trimmer head. The flexible line trimmer head is able to feed the flexible, non-metallic dethatching line from the at least one flexible line trimmer head so the flexible, non-metallic dethatching line engages the ground so as to dethatch the lawn. The dethatching shaft assembly can comprise a drive shaft and the at least one flexible line trimmer head is rotated by the drive shaft.

Yet another aspect of the dethatching device provides an actuator button, in which the actuator button extending from a wheel of the dethatching device. The actuator button comprises a spring biased shaft, wherein the actuator button is movable to cause each flexible line trimmer head to feed the flexible, non-metallic dethatching line therefrom.

A still further aspect of the invention provides the dethatching device with a linkage to feed line from the dethatching shaft assembly. The dethatching device may further comprise a sensor to feed line from the dethatching shaft assembly. Moreover, the dethatching device can further comprise a plurality of dethatching shaft assemblies.

A still further aspect of the dethatching device provides a line cutter to maintain the flexible, non-metallic dethatching line at a length to engage the ground and dethatch the lawn. A still another aspect of the dethatching device is an additional wheel. The additional wheel maintains the dethatching shaft assembly in conforming configuration with the contour of the ground, wherein the flexible, non-metallic dethatching line can engage the ground to dethatch the lawn.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Figure 1:
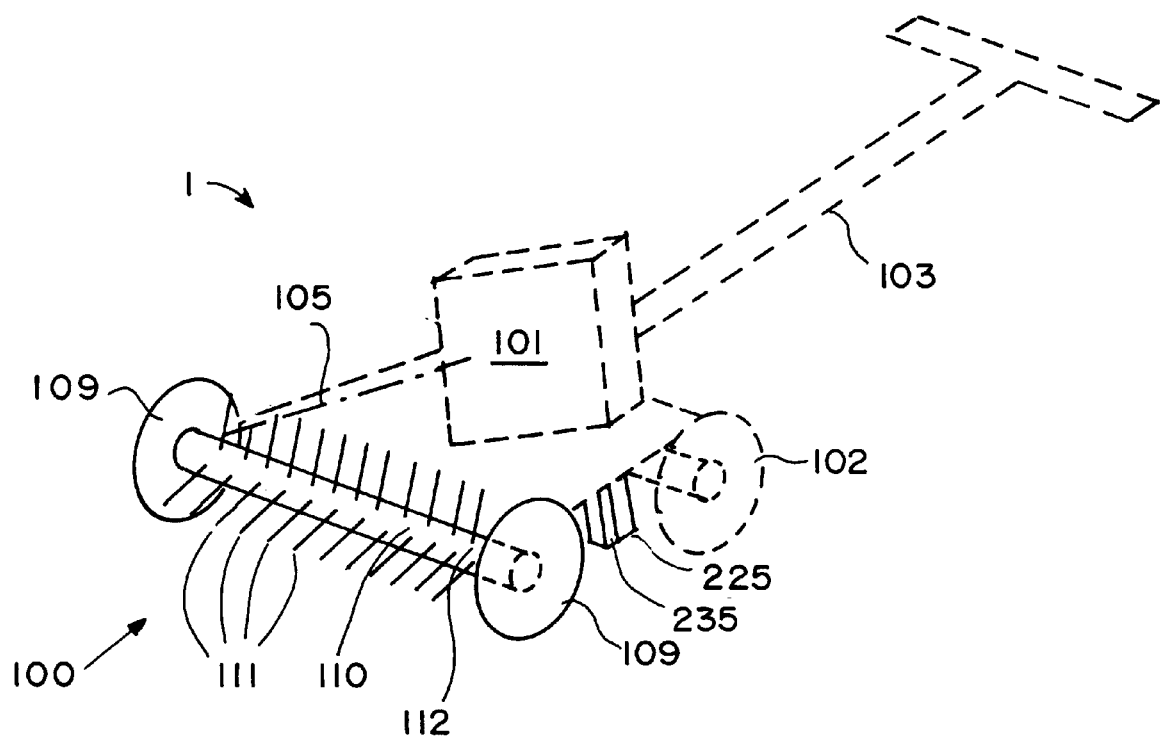
FIG. 1 is a schematic, part-sectional illustration of a dethatching device, as embodied by the invention.

A dethatching device 1, as embodied by the invention, comprises a dethatching shaft assembly 100, a motive device 101, rear wheel assembly 102, and handle assembly 103. The dethatching shaft assembly 100 comprises at least one wheel 109, in 'which two wheels 109 are illustrated, however the scope of the invention comprises the dethatching shaft assembly 100 of the dethatching device 1 with one or more wheels, for example two wheels 109.

The dethatching shaft assembly 100 is connected to the motive device 101 by a drive connection 105, which is schematically illustrated in FIG. 1 by a dash-dotted line. The form of the drive connection 105 is any drive connection that is able to transfer power to rotate the dethatching shaft assembly 100 and possibly drive the dethatching device 1. The motive device 101 provides a motive force to propel the dethatching device 1, drive the shaft 112 of the dethatching shaft assembly 100, and to drive both the shaft 112 and the dethatching device 1.

The dethatching shaft assembly 100 is attached to the dethatching device 1 so as to rotate when the dethatching device 1 is operated. The dethatching shaft assembly 100 comprises a plurality of flexible non-metallic lines 111 (hereinafter "lines") that rotate with the shaft 112 of the dethatching shaft assembly 100. The lines 111 are connected to the shaft 112 and rotate therewith to engage the ground and loosen and remove any thatch on the ground and in the lawn.

Figure 2:
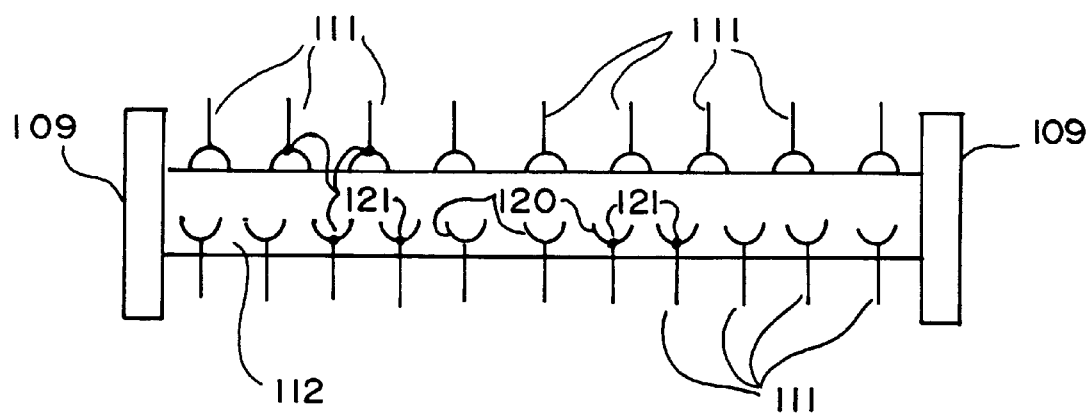
FIG. 2 is schematic illustration of a shaft for a dethatching device, as embodied by the invention.
Figure 3:
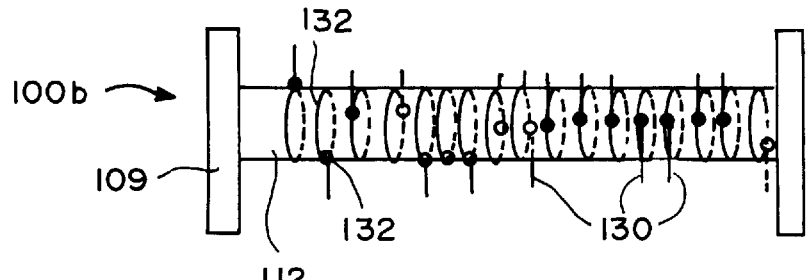
FIG. 3 is schematic illustration of a second shaft for another dethatching device, as embodied by the invention.
Figure 4:
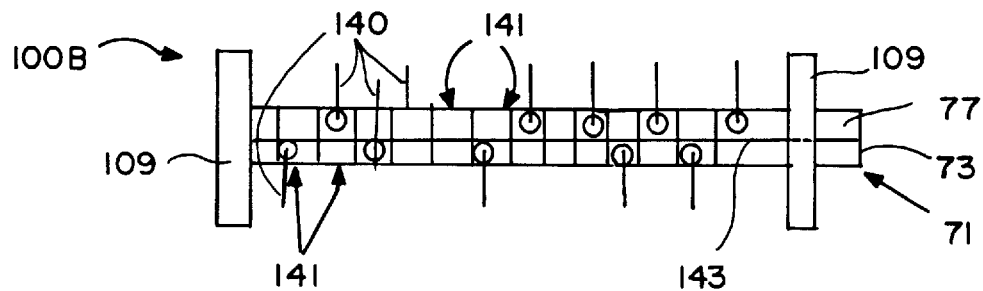
FIG. 4 is schematic illustration of a further shaft for a dethatching device, as embodied by the invention.

The connection of the lines 111 to the shaft 112 is by a means and method that allow for the line 111 to be readily replaced or replenished if the lines should become too short to engage the ground when the dethatching device 1 is operated (as described hereinafter). FIGS. 2–4 illustrate exemplary connections of the lines 111 to the shaft 112, however these connections are merely exemplary, and are not intended to limit the invention in any way. Other connections are within the scope of the invention.

One connection of the lines 111 to the shaft is illustrated in FIG. 2. In FIG. 2, the shaft 112 comprises a plurality of fixment rings or loop 120 (hereinafter "fixment rings). The lines 111 are tied, bound, fixed, fastened, anchored, moored, lashed, or otherwise connected to the fixment rings 120 at 121. The connection of the lines 111 to the fixment rings 120 at 121 is illustrated as connecting one line 111 to each fixment ring 120. The scope of the invention includes at least one line and can include more that one line 111 connected to each fixment ring 120. Each line 111 may be tied, bound, fixed, fastened, anchored, moored, lashed, or otherwise connected, such as by knots, connected by hooks to the fixment rings 120, braided to the fixment ring 120, other such connections, and combinations thereof at 121.

The shaft 112 of the dethatching shaft assembly 100 can rotate the shaft 110 through a drive connection 105 that is operably connects the motive device 101 to the dethatching shaft assembly 100. The wheels 109 of the dethatching shaft assembly 100 can rotate independently of the shaft 112, for example through a clutch, transmission, or other such device. Alternatively, the wheels 109 of the dethatching shaft assembly 100 rotate with shaft 112, for example through a rigid connection therewith.

FIG. 3 illustrates a further configuration of the dethatching shaft assembly 100a. The dethatching shaft assembly 100a of FIG. 3 comprises similar features as discussed above. For reasons of conciseness, the differences in the dethatching shaft assembly 100 of FIG. 1 will be described with respect to the dethatching shaft assembly 100a of FIG. 3. In FIG. 3, the dethatching shaft assembly 100a comprises plurality of flexible non-metallic lines 130 (hereinafter "lines") that are wound around the shaft 112. The lines 130 are wound around the shaft 112 and tied, bound, fixed, fastened, anchored, moored, lashed, or otherwise connected at 131, so that the lines extend out away from the shaft 112 to engage the ground and dethatch a lawn.

The lines 130 of the dethatching shaft assembly 100a may be unconnected at 131 so as to unwind the lines to the extent necessary that the lines can be extended to engage the ground, if the lines become shortened, for example by being sheared on the ground, rocks, or other objects that may be encountered during use of the dethatching device 1. The lines 130 can be re-connected at 132 so the dethatching device 1 with the lines 130 of the dethatching shaft assembly 100a engaging the ground and dethatching the ground.

FIG. 4 illustrates a further configuration of the dethatching shaft assembly 100b. The dethatching shaft assembly 100b of FIG. 4 comprises similar features as discussed above. For reasons of conciseness, the differences in the dethatching shaft assemblies 100 and 100a of FIGS. 1 and 3 will be described with respect to the dethatching shaft assembly 100b of FIG. 4.

In FIG. 4, the dethatching shaft assembly 100b comprises plurality of flexible non-metallic lines 140 (hereinafter "lines") that are connected to drive shaft 143 of the dethatching shaft assembly 100b, in which the drive shaft 143 is internal of the shaft 112. The lines 140 are part of flexible line trimmer heads 141 that are mounted on drive shaft 143 of the shaft 112 of the dethatching shaft assembly 100b. The flexible line trimmer heads 141 each are operable to feed out the lines 140 from the flexible line trimmer heads 141.

Figure 5:
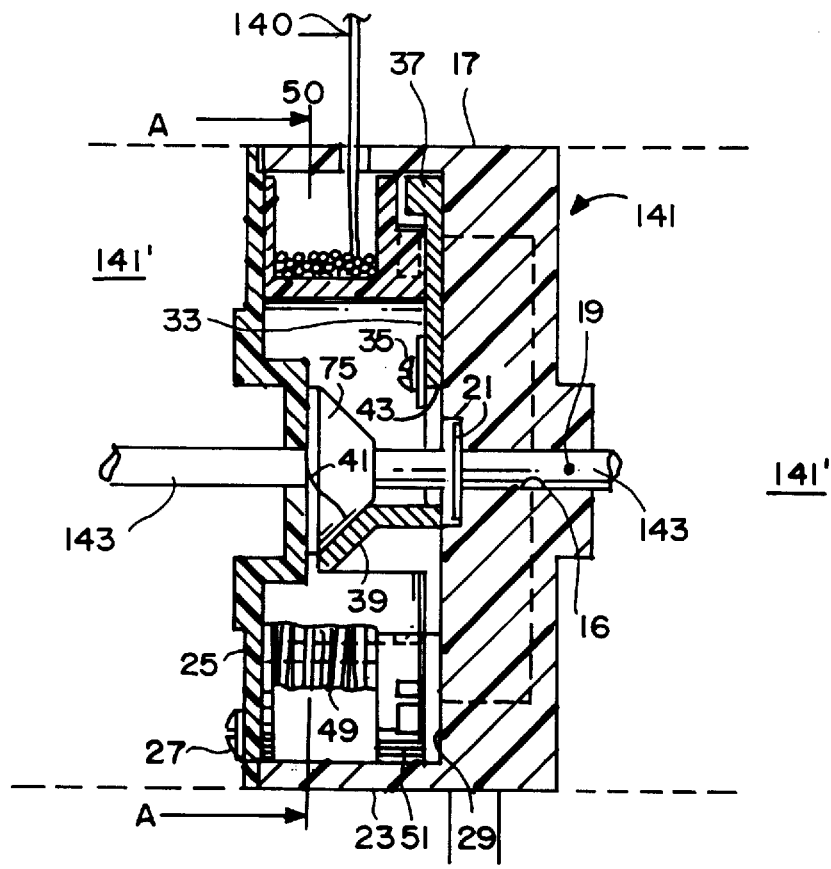
FIG. 5 is a partial cross-sectional illustration of a filament head, as embodied by the invention.

Each flexible line trimmer head 141 will now be described with reference to FIGS. 5, 5A, and 6–9. A flexible line trimmer head 141 is illustrated in FIG. 5 with additional flexible line trimmer heads 141 illustrated in phantom on either side of the illustrated flexible line trimmer head 141. Each flexible line trimmer head 141 comprises a housing 17. A drive shaft 143 extends within the shaft 112, and a locking pin 19 extends transversely through drive shaft 143 and seats within a slot (not shown) within housing 17 for causing the housing 15 to rotate with the drive shaft 143. A retainer ring 21 frictionally engages drive shaft 143 and bears against an upper portion of housing 17 to retain the retainer ring 21 and the drive shaft 143 in engagement with the drive shaft 143.

Figure 7:
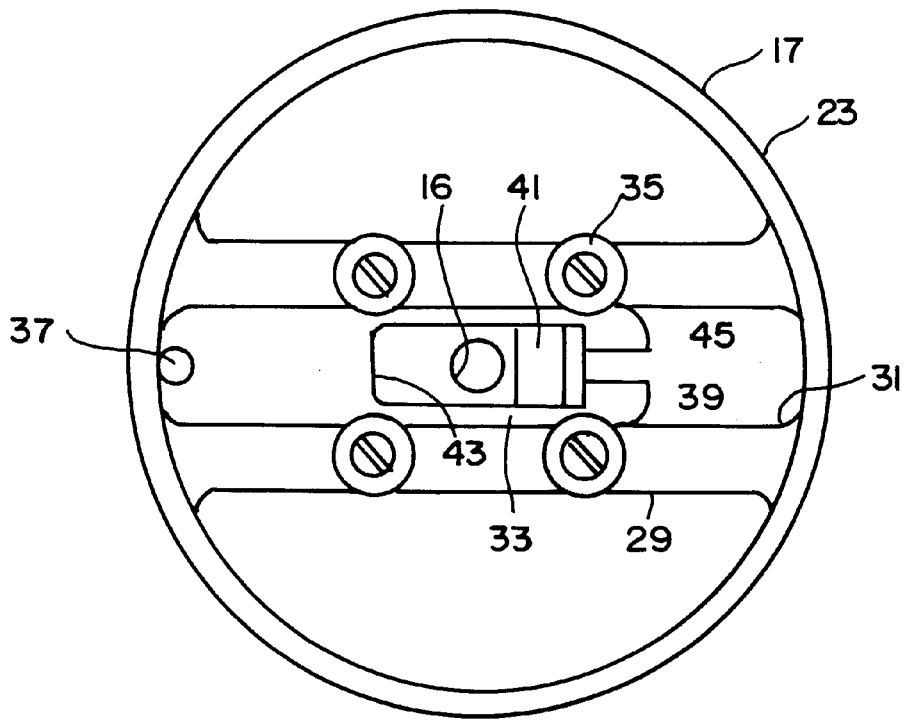
FIG. 7 is a plan illustration of the bottom of the housing of the filament head of FIG. 5.

The housing 17 comprises a cylindrical sidewall 23, and a bottom 25 that is fastened to the sidewall 23 of the housing by connectors 27, such as, but not limited to, rivets, nails, screws, and combinations thereof. As illustrated in FIG. 7, the housing 17 further comprises a partition 29 that is formed transversely across the top of the housing 17. The partition 29 comprises a slot or channel 31 formed therein. An actuator 33 is disposed within the slot 31, and is retained therein by a plurality of screws, and as illustrated in FIG. 3 as four screws 35. The screws 35 allow the actuator 33 to reciprocate within housing 17 in a plane that is generally perpendicular to the drive shaft 143.

The actuator 33 comprises a generally rectangular plate comprising a cylindrical pin 37 on one end that protrudes downward from the plate. A wedge member 39 protrudes generally downwardly (as illustrated in the figures) from the plate proximate the other end.

The wedge member 39 comprises a tapered surface 41 on an end that inclines at about a 45-degree angle with respect to drive shaft 143. The wedge member 39 is generally disposed and faces generally toward the pin 37. A central opening 43 in the actuator is capable of allowing the drive shaft 143 to pass through. The wedge member 39 is generally hollow and comprises a slot 45 that is formed in the end, which lightens the end opposite the pin 37 end. Accordingly, centrifugal force causes the pin 37 to move outward, as in the figures.

Each flexible line trimmer head 141 comprises a spool 47 that is adapted to be wound with lines 140, such as, but not limited to, nylon mono-filament line. The line 140 can comprises any suitable line, either metallic or non-metallic, of any diameter that is able to be operated by the flexible line trimmer head 141. For example, the line 140 can comprise any suitable line that are used in lawn trimmer apparatus known as "weedwackers". The spool 47 is carried by the bottom 25 of housing 17.

Figure 6:
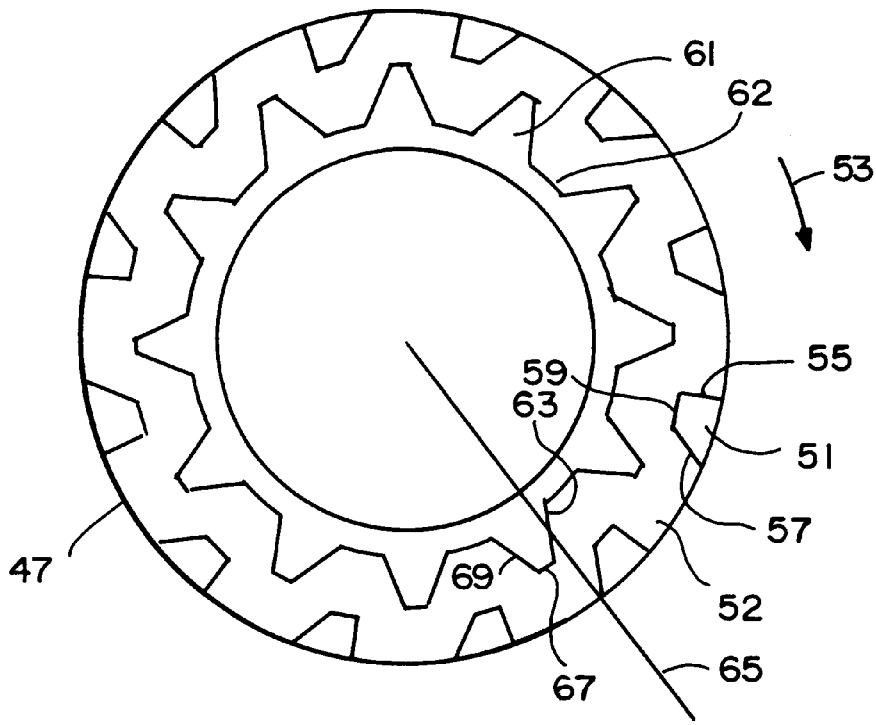
FIG. 6 is a plan illustration of the upper side of the line spool, shown removed from the filament trimmer of FIG. 5.

The free end of the line 49 extends through an aperture or eyelet 50 in housing sidewall 23. Referring to FIG. 6, the spool 47 comprises a set of drive teeth 51 on its upper side. The lower side of the spool 47 is smooth to permit rotation of housing 17 with respect to spool 47. The drive teeth 51 are approximately equally spaced about the perimeter of the spool 47, with spaces 52 defined between the teeth 51 being approximately 1½ times the width of each tooth 51. The direction of rotation of the housing 17 is clockwise, as viewed from above, as indicated by arrow 53 in FIG. 6.

The trailing edge 55 of each drive tooth 51, considering the direction of rotation, lies on a radial line. The leading edge 57 of each of the drive teeth 51 lies on about a 450 line with respect to the trailing edge 55 of the respective drive teeth 51. An inner end 59 of each tooth 51 is generally blunt and lies at an approximate right angle with respect to the trailing edge 55 of each tooth 51.

The flexible line trimmer heads 141 further comprises a set of guide teeth 61. The set of guide teeth 61 is formed on the spool upper side disposed radially inward from the drive teeth 51, as illustrated. The guide teeth 61 are generally equally spaced from each other with spaces 62 defined between each of the guide teeth 61. Each guide tooth 61 is spaced radially inward from a space 52 between two drive teeth 51. Each guide tooth 61 has a trailing edge 63 that generally starts on substantially the same radial line 65 that defines an extreme end of the drive tooth leading edge 57. The guide tooth trailing edge 63 of each guide tooth 61 is substantially parallel to the drive tooth leading edge 57.

Each guide teeth 61 has blunt outer ends 67 and leading edges 69 that are generally symmetrical with the trailing edges 63 of the guide teeth 61. The guide teeth outer ends 67 are substantially the same distance from the center of spool 47, as the drive teeth inner end 59. The height of the drive teeth 51 and guide teeth 61 is approximately slightly greater than the height of the actuator pin 37.

Figure 5A:
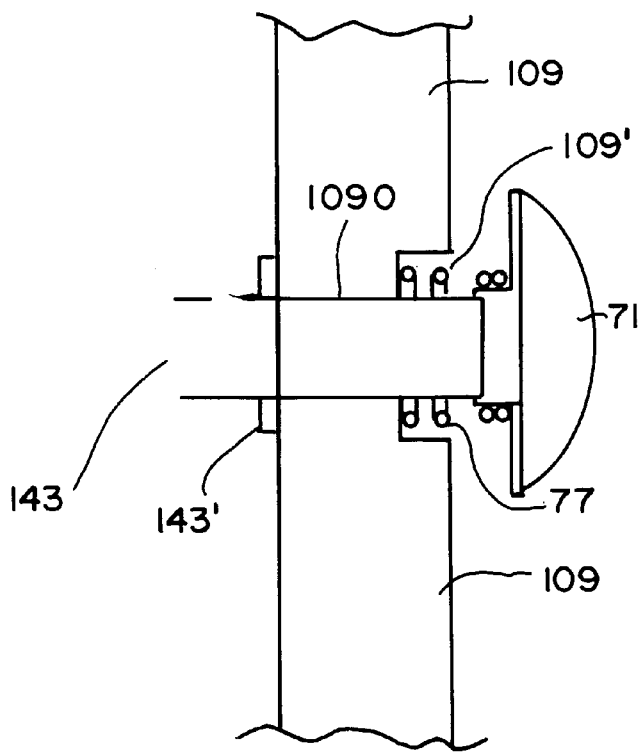
FIG. 5A is a partial cross-sectional view of an actuator head for a dethatching shaft assembly, as embodied by the invention.

Referring to FIGS. 4 and 5A, the dethatching shaft assembly 100b comprises an actuator button 71 that extends from a depression 109' in a wheel 109 of the dethatching device 1. The actuator button 71 is carried by the shaft 143 that extends through an aperture 1090 in the wheel 109. The actuator shaft 73 is axially moveable with respect to wheel 109 and comprises a stop device 143 that limits the movement of the actuator button 73. A coil spring 77 encircles actuator shaft 73 and is compressed between wheel 109 in the depression 109' and button 71. The spring 77 provides bias means for urging the button 71 outwardly from the wheel 109.

As illustrated in FIG. 5, the drive shaft 143 comprises a tapered end unit 75 that comprises a generally conical-shaped configuration, with the sides of the tapered end unit being inclined at about a 45° angle with respect to the drive shaft 143. The tapered end unit 75 comprises a central bore (not illustrated) for slidingly receiving the drive shaft 143. The tapered end unit 75 bears slidingly against the wedge tapered surface 41 to translate any axial movement of the button 71 into transverse movement of the actuator 33.

In operation, spool 47 is wound with line 140, then inserted up over drive shaft 143 until its upper surface bears against partition 29. The free end of line 140 is threaded out eyelet 50 for the desired length to engage the ground to dethatch the lawn. The length of the line 140 may be in a range from about 3 to about 6 inches, and may vary depending on the application of and lawn upon which the dethatching device 1 is being used. The wedge member 39 will be within the central opening of spool 47. The housing button 25 is fastened by screws 27 to retain the spool 47 in place.

Figure 8:
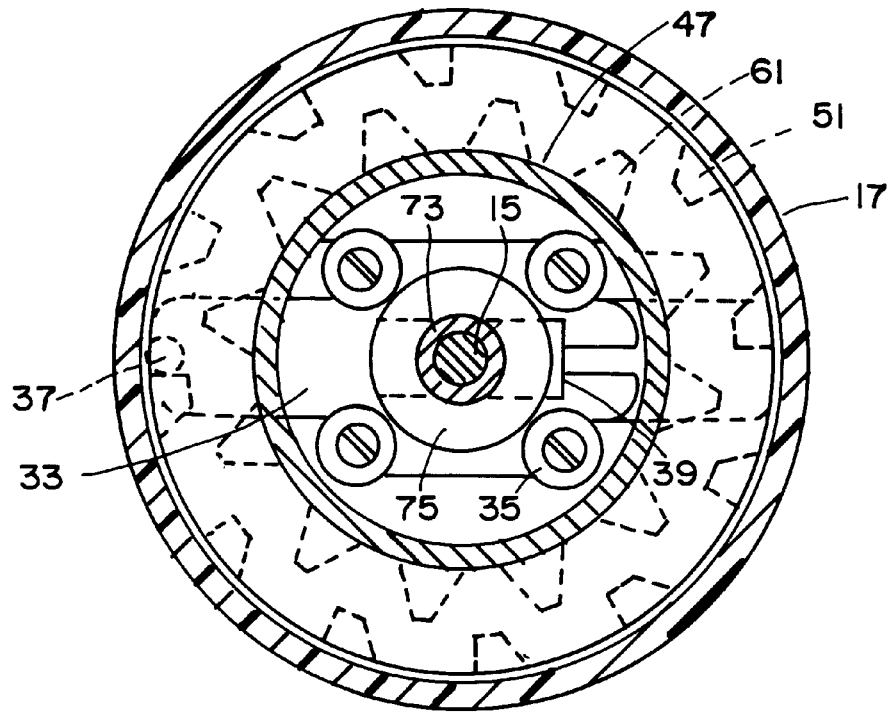
FIG. 8 is a cross-sectional illustration of the filament head of FIG. 5 taken along the lines A—A.
Figure 9:
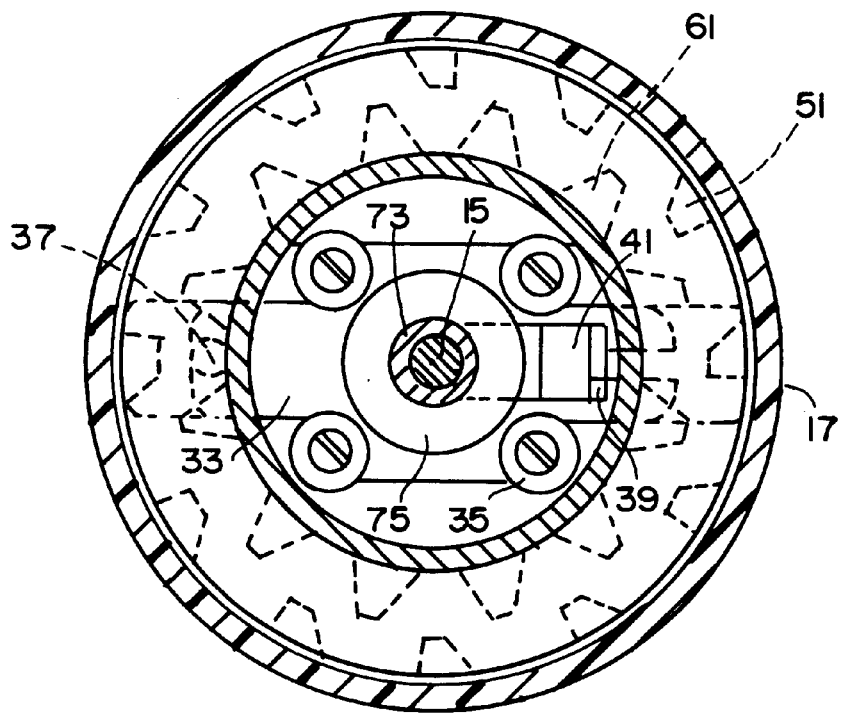
FIG. 9 is a cross-sectional illustration of the filament head of FIG. 5 taken along the lines A—A, with the actuator in the disengaged position.

When the motive device 101 moves the dethatching device 1, and the dethatching shaft assembly 100b moves the flexible line trimmer heads 141 of the shaft 112, centrifugal forces acting thereon by the rotation urges actuator pin 37 into engagement with one of the guide teeth 51, as shown in FIG. 8. The pin 37 bears against the trailing edge 55, and causes the spool 47 to rotate in unison with housing 17. When it becomes necessary to feed out additional line 140 from the dethatching device 1, the actuator head 71 is moved (as discussed hereinafter), shaft 143 against the bias of the spring 77.

The tapered end unit 75 slides on the wedge member tapered surface 41, sliding the actuator to the right, as shown in FIG. 5. The tapered end unit 75 and wedge member 39 serve as translator means for causing upward movement of the button to disengage actuator pin 37 from the drive teeth 51. Since the spool is no longer driven, housing 17 will rotate with respect to it, unwinding more line 49.

The pin 37 will quickly contact the trailing edge 63 of the adjacent guide tooth 61. The centrifugal force then slings the pin 37 into the path of the next drive tooth 51. The spool 47 will continue to slip until the pin engages the trailing edge of the next drive tooth 51. The line 140 thus feeds out a distance proportional to the distance between the trailing edges of the two drive teeth.

Once the pin 37 leaves the outer end of the guide tooth 61, it will be in the path of the next drive tooth 61. Therefore, the guide teeth serve as incremental means that allow the spool 47 to slip with respect to the housing rotation only a predetermined and selected amount when the button 71 is depressed.

Figure 12:
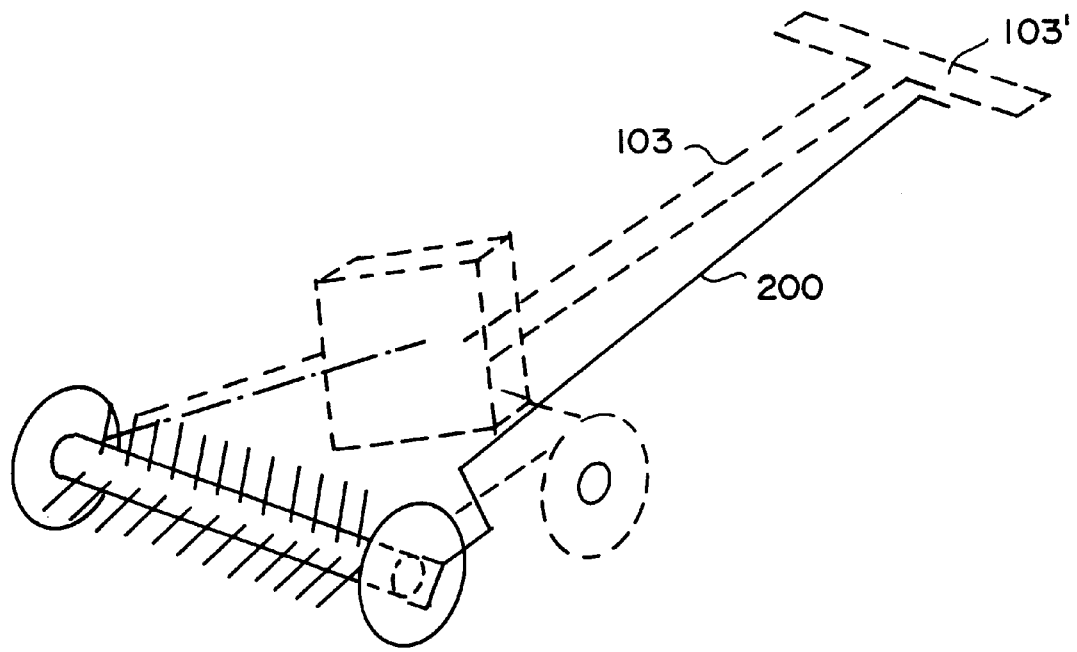
FIG. 12 is a schematic, part-sectional illustration of another dethatching device, as embodied by the invention.

The button 71 of the dethatching shaft assembly 100b of the dethatching device 1 is moved to thread out and fed line 140, as embodied by the invention. The button 71 may be moved by direct contact of a user of the dethatching device 1, for example by contacting the button 71 during operation of the dethatching device 1. The touching may be by the user's foot, hand, or other appropriate manner of contacting the button 71 by other like means. As illustrated in FIG. 12 (other features of the dethatching device 1 are illustrated in phantom for simplicity sake), a remote control linkage extends the length of the dethatching device 1, for example from a handle 103' of the handle assembly 103. The linkage 200 extends along the handle 103 to the button by appropriate connections (not illustrated). In use, the user of the dethatching device 1 moves the linkage 200 to reciprocate the button 71 and fed line 140 from the flexible line trimmer heads 141. Thus, the dethatching device 1 can have line fed therefrom for continued dethatching use.

Alternatively, the dethatching device 1 may comprise a sensor unit 225 (FIG. 1) that detects the length of the line. The sensor 225 may automatically feed line 140 from the flexible line trimmer heads 141, for example by automatically actuating the button 71. Thus, the dethatching device 1 can have line fed therefrom for continued dethatching use.

The dethatching device 1 may also comprise a line cutter 235 (FIG. 1) associated with each dethatching shaft assembly, as embodied by the invention. For example, the line cutter 235 is a blade or other such device that maintains the line at an adequate length for contacting the ground and dethatching the lawn. The exact form of the line cutter 235 is not critical to the operation of the dethatching device 1.

Figure 10:
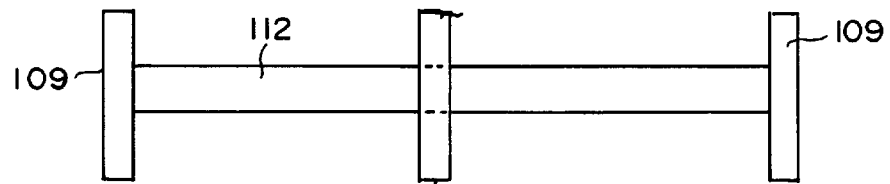
FIG. 10 is a schematic illustration of a shaft with an additional wheel that allows that shaft to conform to the contour of a lawn.

FIG. 10 illustrates a configuration of a dethatching shaft assembly that further comprises an additional wheel 209. The additional wheel 209 maintains the dethatching shaft assembly over its entire length in substantial conforming configuration with the contour of the ground. For example, the additional wheel 209 rides upwardly or downwardly, as illustrated by arrows 209a and 209b, thus the lines that extend from the dethatching shaft assembly will contact the ground regardless of the contour of the ground.

Figure 11:
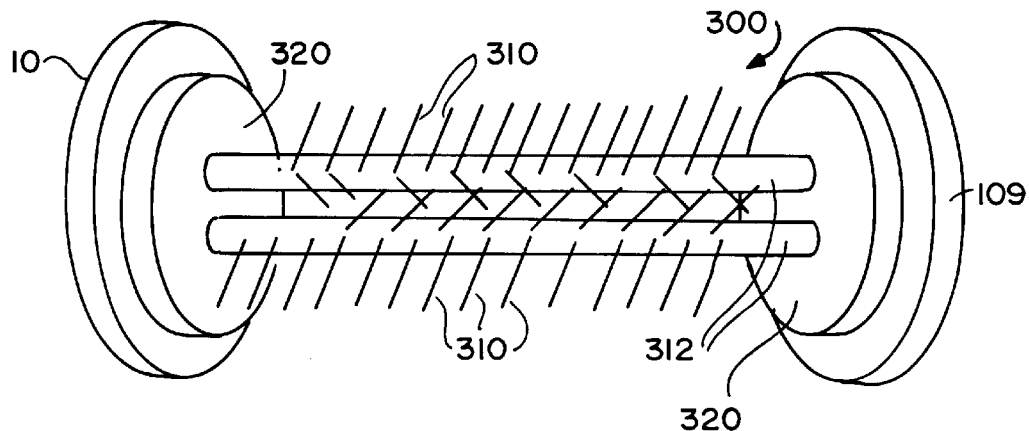
FIG. 11 is a shaft for a dethatching device, as embodied by the invention.

FIG. 11 illustrates a further embodiment of a dethatching shaft assembly for the dethatching device, as embodied by the invention. In FIG. 11, the dethatching shaft assembly 300 comprises a plurality of shafts 312 that include a plurality of lines 310. FIG. 11 illustrates tow shafts 312, however this number of shafts is merely exemplary and is not meant to limit the invention in any way. The scope of the invention comprises any number of shafts 312. The shafts 312, as embodied by the invention, can be configured as in any of the hafts for the dethatching shaft assemblies, as described above. The shafts 312 of FIG. 11, are mounted on dethatching shaft assembly rotating units 320 that are mounted to wheels 109. The dethatching shaft assembly rotating units 320 may rotate independently of the wheels 109, with the wheels 109 as a single unit, or combinations —thereof, for example by clutches, transmissions, or other such devices.

Figure 13:
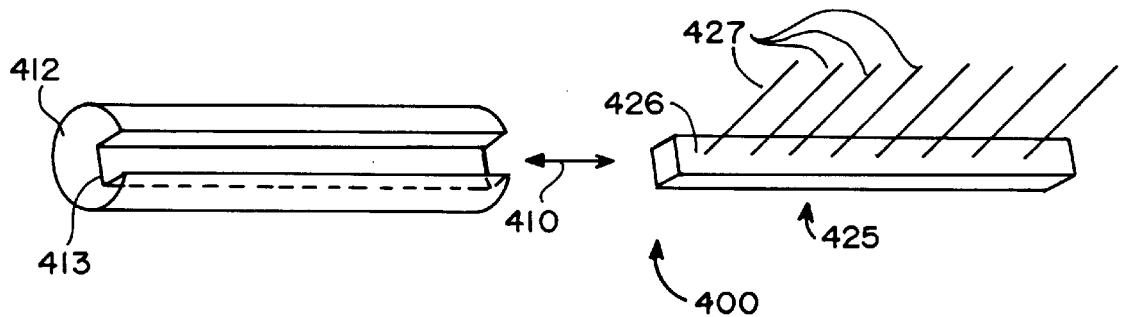
FIG. 13 is a schematic, part-sectional illustration of yet another dethatching device, as embodied by the invention.

FIG. 13 illustrates a further embodiment of a dethatching shaft assembly for the dethatching device, as embodied by the invention. In FIG. 13, the dethatching shaft assembly 400 comprises a shaft 412 and a flexible trimmer line cartridge 425. The shaft 412 comprises a cutout 413 that is formed with a configuration that is complementary to the configuration of the flexible trimmer line cartridge 425. As illustrated, the cutout 413 formed with a generally rectangular configuration that is complementary to the generally rectangular configuration of the flexible trimmer line cartridge 425. The illustrated shape of the cutout 413 in FIG. 13 is merely exemplary of the configurations that are within the scope of the invention, and the illustrated generally rectangular configuration is not intended to limit the invention in any manner.

The outer configuration of the shaft 412 is illustrated as generally circular, and outer configuration of surface 426 of the flexible trimmer line cartridge 425 is formed with complementary configuration to that of the shaft 412. Further, the shape of the flexible trimmer line cartridge 425 is in close conformance with the cutout 413 so the flexible trimmer line cartridge 425 is snuggly fit in the cutout 413. For example, and in no way limiting of the invention, the flexible trimmer line cartridge 425 may be formed with a slight increase in cross-section from one end to another end, so when inserted onto the cutout, such as in a sliding manner as indicated by arrow 410, the flexible trimmer line cartridge 425 is frictionally held within the cutout 413.

The flexible trimmer line cartridge 425 comprises a generally rectangular in shape with a length that is approximately equal to the length of the shaft 412. The flexible trimmer line cartridge 425 comprises at least one flexible trimmer line 427, such as a plurality of flexible trimmer lines 427, as illustrated.

Each of the flexible trimmer lines 427 may be formed with the flexible trimmer line cartridge 425 so the flexible trimmer lines 427 and the flexible trimmer line cartridge 425 form a single, integral, one-piece unit. The single, integral, one-piece unit can be replaced in the dethatching device 1 by simply removing the single, integral from the shaft 412, and replacing the single, integral, one-piece unit with another single, integral, one-piece unit.

Alternatively, each of the flexible trimmer lines 427 may be formed separately from the flexible trimmer line cartridge 425. Thus, each of the flexible trimmer lines 427 may be individually replaced as needed if a flexible trimmer line breaks or needs replacement As another alternative, the flexible trimmer lines 427 may be wound in the flexible trimmer line cartridge 425. Therefore, the flexible trimmer line 427 may be extended from the flexible trimmer line cartridge 425 as needed for dethatching purposes. The flexible trimmer line 427 may be extended from the flexible trimmer line cartridge 425 by hand pulling the flexible trimmer lines 427 out of the flexible trimmer line cartridge 425.

Alternatively, the flexible trimmer lines 427 may be provided in the flexible trimmer line cartridge 425 in a flexible line trimmer spool, such as a flexible line trimmer head 141, as described above. These flexible trimmer lines 427 may be extended from the spool by a push button, automatic means, simple ratchet extension system, or other similar means, as described above.

Figure 14:
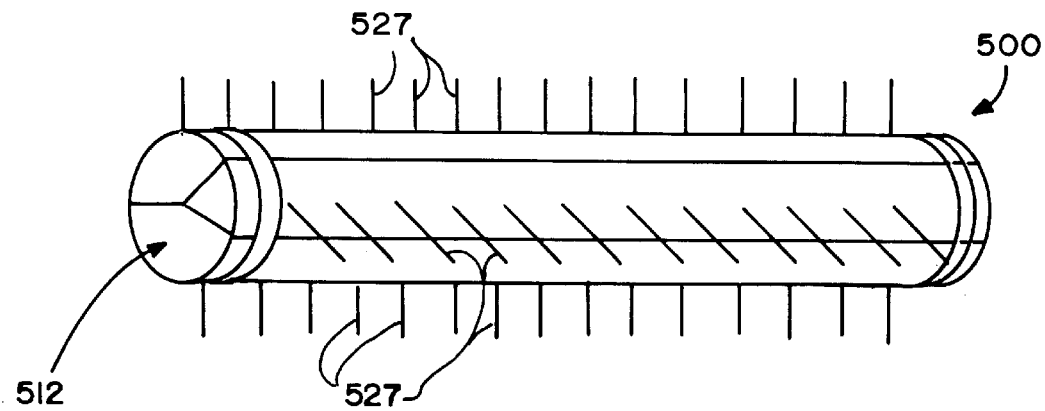
FIG. 14 is a schematic, part-sectional illustration of a still further dethatching device, as embodied by the invention.

FIG. 14 illustrates a further embodiment of a dethatching shaft assembly for the dethatching device, as embodied by the invention. In FIG. 14, the dethatching shaft assembly 500 comprises a shaft 512 and a flexible trimmer line 527. The shaft 512 comprises at least two flexible trimmer line cartridges 525, and as illustrated three of the flexible trimmer line cartridges 525. The shape of the flexible trimmer line cartridges 525 are complementary to form a shaft 512 that can be used in the dethatching device 1, as embodied by the invention. The illustrated number and configurations of flexible trimmer line cartridges 525 is merely exemplary of the number and configurations that are within the scope of the invention, and the illustrated generally rectangular configuration is not intended to limit the invention in any manner.

The flexible trimmer line cartridge 525 comprises at least one flexible trimmer line 527, such as a plurality of flexible trimmer lines 527, as illustrated. Each of the flexible trimmer lines 527 may be formed with the flexible trimmer line cartridge 525 so the flexible trimmer lines 527 and the flexible trimmer line cartridge 525 form a single, integral, one-piece unit. The single, integral, one-piece unit can be replaced in the dethatching device 1 by simply removing the single, integral from the shaft 512, and replacing the single, integral, one-piece unit with another single, integral, one-piece unit.

Alternatively, each of the flexible trimmer lines 527 may be formed separately from the flexible trimmer line cartridge 525. Thus, each of the flexible trimmer lines 527 may be individually replaced as needed if a flexible trimmer line breaks or needs replacement As another alternative, the flexible trimmer lines 527 may be wound in the flexible trimmer line cartridge 525. Therefore, the flexible trimmer line 527 may be extended from the flexible trimmer line cartridge 525 as needed for dethatching purposes. The flexible trimmer line 527 may be extended from the flexible trimmer line cartridge 525 by hand pulling the flexible trimmer lines 527 out of the flexible trimmer line cartridge 525.

Alternatively, the flexible trimmer lines 527 may be provided in the flexible trimmer line cartridge 525 in a flexible line trimmer spool, such as a flexible line trimmer head 141, as described above. These flexible trimmer lines 527 may be extended from the spool by a push button, automatic means, simple ratchet extension system, or other similar means, as described above.

While embodiments of the invention have been described, the present invention is capable of variation and modification, and therefore should not be limited to the description herein. The invention includes changes and alterations that fall within the purview of the following claims. Individual components of the described and illustrated embodiments may be used interchangeably with each other components of the described and illustrated embodiments.

What is claimed:

1. A dethatching device comprising:
 a dethatching shaft assembly comprising a generally horizontally disposed shaft and a plurality of flexible, non-metallic dethatching lines, wherein each of the plurality of flexible, non-metallic dethatching lines extend from the shaft and rotate with the shaft to engage the ground and loosen and remove any thatch on the ground and in the lawn and the dethatching shaft assembly comprises a plurality of flexible line trimmer heads, the plurality of flexible line trimmer heads being disposed on the generally horizontally disposed shaft and the generally horizontally disposed shaft being able to feed the flexible, non-metallic dethatching line from the at least one flexible line trimmer head so the flexible, non-metallic dethatching line engages the ground so as to dethatch the lawn.

2. A device according to claim 1, wherein the dethatching device further comprises a motive device, rear wheel assembly, and handle assembly, and the dethatching shaft assembly further comprises at least one wheel.

3. A device according to claim 2, wherein the dethatching shaft assembly is connected to the motive device by a drive connection.

4. A device according to claim 1, wherein the flexible, non-metallic dethatching lines are connected to the shaft of the dethatching shaft assembly by a connection.

5. A device according to claim 1, wherein the shaft of the dethatching shaft assembly comprise a plurality of fixment rings, and the flexible, non-metallic dethatching lines are connected to the fixment rings.

6. A device according to claim 5, wherein one of the flexible, non-metallic dethatching lines is attached to one of the plurality of fixment rings.

7. A device according to claim 5, wherein the connection of the flexible, non-metallic dethatching lines to the shaft of the dethatching shaft assembly is selected from tied connections, bound connections, fixed connections, fastened connections, anchored connections, moored connections, lashed connections, and combinations thereof.

8. A device according to claim 1, the dethatching device further comprising an additional wheel, the additional wheel maintaining the dethatching shaft assembly in conforming configuration with the contour of the ground, wherein the flexible, non-metallic dethatching line can engage the ground to dethatch the lawn.

9. A device according to claim 1, wherein the dethatching shaft assembly comprises a drive shaft and the at least one flexible line trimmer head is rotated by the drive shaft.

10. A device according to claim 1, wherein the dethatching device further comprises an actuator button, the actuator button extending from a wheel of the dethatching device.

11. A device according to claim 10, wherein the actuator button comprises a spring biased shaft, wherein the actuator button is movable to cause each flexible line trimmer head to feed the flexible, non-metallic dethatching line therefrom.

12. A device according to claim 1, the dethatching device further comprising a linkage to feed line from the dethatching shaft assembly.

13. A device according to claim 1, the dethatching device further comprising a sensor to feed line from the dethatching shaft assembly.

14. A device according to claim 1, the dethatching device further comprising a plurality of dethatching shaft assemblies.

15. A device according to claim 1, the dethatching device further comprising a line cutter to maintain the flexible, non-metallic dethatching line at a length to engage the ground and dethatch the lawn.

* * * * *